US009657449B2

(12) United States Patent
Swetish

(10) Patent No.: US 9,657,449 B2
(45) Date of Patent: May 23, 2017

(54) PET WASTE RECEPTACLE

(71) Applicant: Rowena Swetish, Stockton, CA (US)

(72) Inventor: Rowena Swetish, Stockton, CA (US)

( * ) Notice: Subject to any disclaimer, the term of this patent is extended or adjusted under 35 U.S.C. 154(b) by 0 days.

(21) Appl. No.: 15/136,067

(22) Filed: Apr. 22, 2016

(65) Prior Publication Data

US 2016/0312419 A1 Oct. 27, 2016

Related U.S. Application Data

(60) Provisional application No. 62/150,941, filed on Apr. 22, 2015.

(51) Int. Cl.

| | |
|---|---|
| ***A01K 29/00*** | (2006.01) |
| ***E01H 1/12*** | (2006.01) |
| ***A01K 1/01*** | (2006.01) |

(52) U.S. Cl.

CPC ............. *E01H 1/1206* (2013.01); *A01K 1/01* (2013.01); *A01K 29/00* (2013.01); *E01H 2001/126* (2013.01)

(58) Field of Classification Search

CPC ............ E01H 1/1206; E01H 2001/126; A01K 23/005; A01K 1/0107; A01K 1/01; A01K 29/00

USPC .......................................................... 294/1.3

See application file for complete search history.

(56) References Cited

U.S. PATENT DOCUMENTS

| | | | | |
|---|---|---|---|---|
| 3,978,540 | A * | 9/1976 | Peck | E01H 1/1206 294/1.3 |
| 4,205,869 | A * | 6/1980 | Mathis | E01H 1/1206 15/104.8 |
| 4,458,932 | A | 7/1984 | Resch | |
| 5,222,777 | A * | 6/1993 | Clonch | E01H 1/1206 294/1.3 |
| 5,562,319 | A * | 10/1996 | Kohler | E01H 1/1206 294/1.4 |
| 5,725,268 | A * | 3/1998 | Besasie | E01H 1/1206 294/1.3 |
| 6,439,627 | B1 * | 8/2002 | Devane | E01H 1/1206 294/1.3 |
| 7,845,694 | B1 | 12/2010 | Lockwood | |
| 7,976,083 | B2 | 7/2011 | Black et al. | |
| 8,672,372 | B2 | 3/2014 | Dan | |
| 2009/0315349 | A1 * | 12/2009 | Black | E01H 1/1206 294/1.3 |
| 2014/0265379 | A1 | 9/2014 | Joseph-de Saram et al. | |

* cited by examiner

*Primary Examiner* — Stephen Vu

(74) *Attorney, Agent, or Firm* — Global Intellectual Property Agency, LLC; Daniel Boudwin

(57) ABSTRACT

A waste receptacle for storing pet waste is provided. The waste receptacle includes a substantially planar base, peripheral sidewalls extending from the base, and an upper opening defining an interior volume configured to store animal waste therein. The peripheral sidewalls each include an upper portion connected to a lower portion. The upper portion includes ridges thereon so that a user can grip the upper portion and so that the user will not feel the pet waste when picking it up using the waste receptacle. In some embodiments, the lower portion of the waste receptacle is rigid so as to further avoid the sensation of contact between the user's hand and the pet waste stored in the waste receptacle.

10 Claims, 2 Drawing Sheets

11 16 14 25 18 13 19 26 15 12

PET WASTE RECEPTACLE

CROSS REFERENCE TO RELATED APPLICATIONS

This application claims the benefit of U.S. Provisional Application No. 62/150,941 filed on Apr. 22, 2015. The above identified patent application is herein incorporated by reference in its entirety to provide continuity of disclosure.

BACKGROUND OF THE INVENTION

The present invention relates to waste receptacles. More specifically, the present invention relates to waste receptacles configured to store pet waste having at least one rigid portion in order to avoid the sensation of contact between the user's hand and the pet waste.

Many individuals enjoy having a dog or other pet. One responsibility of pet owners is to dispose of waste left by the pet. For example, dog owners often walk their dog in public spaces and are legally required to pick up solid waste the dog leaves behind. It can be an unpleasant experience to remove pet waste from a surface. Many individuals even forgo this important responsibility due to its unpleasant nature.

Pet owners typically utilize a plastic bag to pick up waste, whereby the plastic bag is inverted and placed over the user's hand and then folded around the pet waste after the user picks up the pet waste. This method of retrieving pet waste requires the user to pick up the pet waste with their hands. While the plastic bag provides a barrier between the pet waste and the user's hand, the plastic bag is thin and necessarily conforms to the shape of the pet waste. This causes users to feel a sensation of contact between the user's hands and the pet waste despite the presence of a plastic film barrier therebetween. The feeling of the pet waste in one's hand can be unpleasant and can further deter individuals from picking up after their pet. Therefore, it is desirable to provide a pet waste receptacle that allows users to retrieve pet waste without the sensation of contacting the pet waste with their hands.

Devices have been disclosed in the prior art that relate to waste receptacles for use in removing and storing pet waste. These include devices that have been patented and published in patent application publications. These devices generally relate to waste receptacles having various structures, such as U.S. Pat. No. 8,672,372, U.S. Pat. No. 4,458,932, U.S. Pat. No. 7,845,694, U.S. Published Patent Application Number 2014/0265379, and U.S. Pat. No. 7,976,083.

These prior art devices have several known drawbacks. The prior art devices do not provide a waste receptacle having ridges thereon for improved grip. These prior art devices further include receptacles such as thin plastic film bags. Such devices fail to provide a pet waste receptacle having a rigid portion and a bendable portion wherein both portions are configured to prevent the sensation of contact between the user's hands and the pet waste the user is picking up.

In light of the devices disclosed in the prior art, it is submitted that the present invention substantially diverges in design elements from the prior art and consequently it is clear that there is a need in the art for an improvement to pet waste receptacles. In this regard the instant invention substantially fulfills these needs.

SUMMARY OF THE INVENTION

In view of the foregoing disadvantages inherent in the known types of waste receptacles now present in the prior art, the present invention provides a pet waste receptacle wherein the same can be utilized for providing convenience for the user when picking up and storing pet waste. The present system comprises a substantially planar base and peripheral sidewalls disposed on a perimeter of the base extending vertically therefrom, the peripheral sidewalls each having an upper portion and a lower portion. An interior volume is defined by the peripheral sidewalls and the base, and an opening for accessing the interior volume is defined by an upper portion of the peripheral sidewalls. The upper portion of each sidewall is malleable and configured to maintain a particular shape when hand-formed.

One object of the present invention is to provide a waste receptacle for storing pet waste having all of the advantages of the prior art and none of the disadvantages.

Another objection of the present invention is to provide a waste receptacle having an interior volume configured to receive pet waste therein.

A further object of the present invention is to provide a waste receptacle that allows users to pick up pet waste while eliminating the sensation of contact between the user's hands and the pet waste.

Yet another object of the present invention is to provide a waste receptacle having a rigid lower portion.

Still a further objection of the present invention is to provide a waste receptacle having an upper portion with a plurality of ridges thereon in order to further prevent the feeling of contact with the pet waste.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
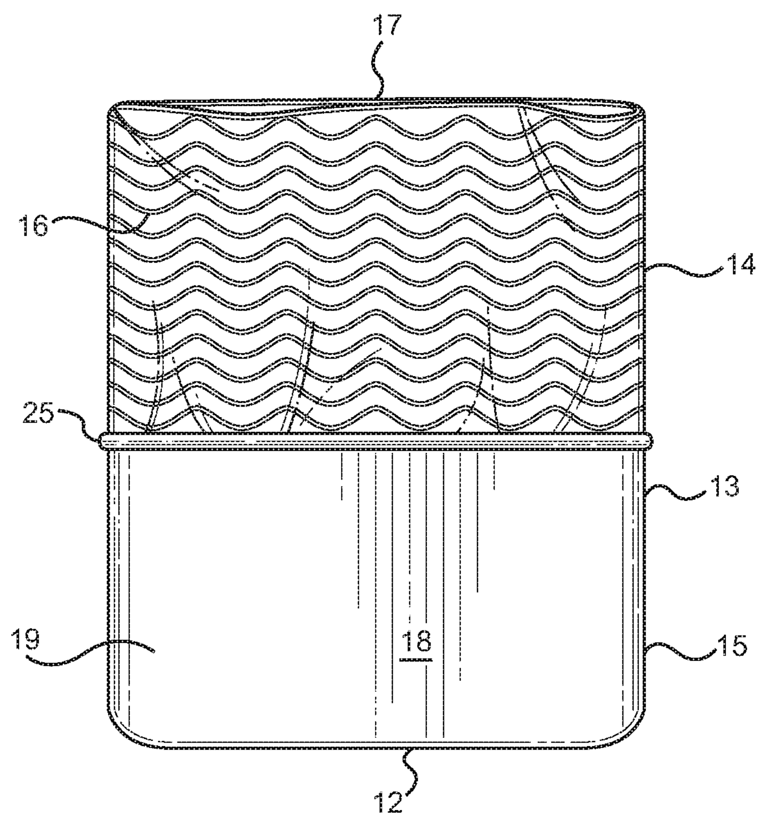
FIG. 1A shows a side view of a waste receptacle according to the present invention in an open configuration.

Reference is made herein to the attached drawings. Like reference numerals are used throughout the drawings to depict like or similar elements of the waste receptacle. For the purposes of presenting a brief and clear description of the present invention, the preferred embodiment will be discussed as used for picking up and storing pet waste. The figures are intended for representative purposes only and should not be considered to be limiting in any respect.

Referring now to FIG. 1A, there is shown a side view of a waste receptacle according to the present invention in an open configuration. The waste receptacle 11 generally comprises a substantially planar base 12 and peripheral sidewalls 13 extending vertically therefrom, the peripheral sidewalls 13 having an upper portion 14 and a lower portion 15. The lower portion 15 of the sidewalls is preferably integrally formed with the base 12. The upper portion 14 of the sidewalls 13 has a plurality of ridges 16 disposed thereon. The ridges 16 aid the user in gripping pet waste and prevent the user's fingers from feeling a sensation of contact with the pet waste through the waste receptacle 11. The ridges 16 may be disposed on both the interior and exterior surface of the pet waste bag, or may be disposed only on the exterior surface.

In one embodiment, the upper portion 14 and lower portion 15 of the sidewalls 13 are integrally formed with one another. In the illustrated embodiment, the upper portion 14 and lower portion 15 each connect to a support member 25 such as a rigid rod. The support member 25 is disposed around the circumference of the waste receptacle 11. In the illustrated embodiment, the support member 25 is positioned such that it bisects the waste receptacle 11 between the upper portion 14 and lower portion 15 of the sidewalls 13. However, the support member 25 may occupy other positions along the length of the waste receptacle 11.

An opening 17 is disposed on the upper portion 14 of the sidewalls 13. The opening 17 provides access to an interior volume 19. The interior volume 19 is defined by the sidewalls 13 and the base 12 and is configured to store pet waste therein. Further, the lower portion 15 of the sidewalls 13 may be pliable, but is preferably rigid in order to prevent the sensation of contact between the user's hands and any pet waste stored within the waste receptacle 11. Additionally, the exterior surface 18 of the pet waste bag is of a sufficient thickness so as to be configured to prevent accidental leaking of pet waste therefrom.

Figure 1B:
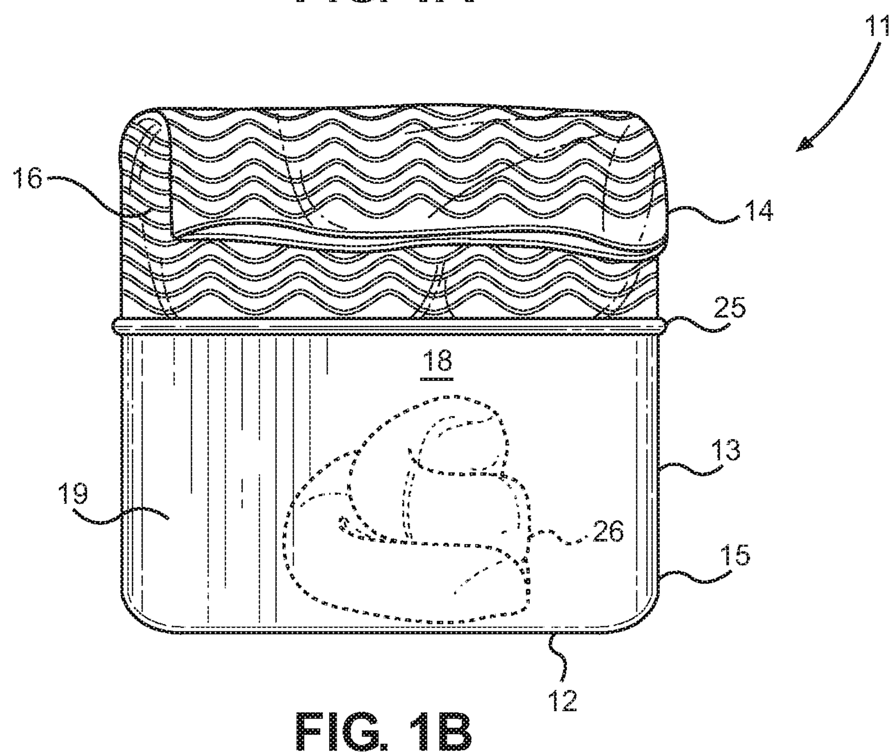
FIG. 1B shows a side view of a waste receptacle according to the present invention in a closed configuration.

Referring now to FIG. 1B, there is shown a side view of a waste receptacle according to the present invention in a closed configuration. The waste receptacle 11 is shown containing pet waste 26 in the interior volume 19 thereof, wherein the pet waste 26 is supported by an interior surface of the base 12. In the illustrated embodiment, the lower portion 15 of the sidewalls 13 is rigid such that the lower portion 15 retains its shape and prevents the feeling of contact between and individual's hands at the pet waste 26. The exterior surface 18 of the waste receptacle 11 is preferably waterproof so as to prevent any liquid portion of the pet waste 26 from leaking through the waste receptacle 11.

When pet waste 26 is disposed within the interior volume 19 of the waste receptacle 11, the upper portion 14 of the sidewalls 13 foldable in a downward direction toward the support member 25 such that the opening 17 is closed and the interior volume 19 is inaccessible. In one embodiment, the ridges 16 comprise malleable and bendable materials, and are further configured to retain their shape when bent. This allows the upper portion 14 to maintain a closed position, prevent pet waste 26 from accidentally falling out of the waste receptacle 11.

Figure 2:
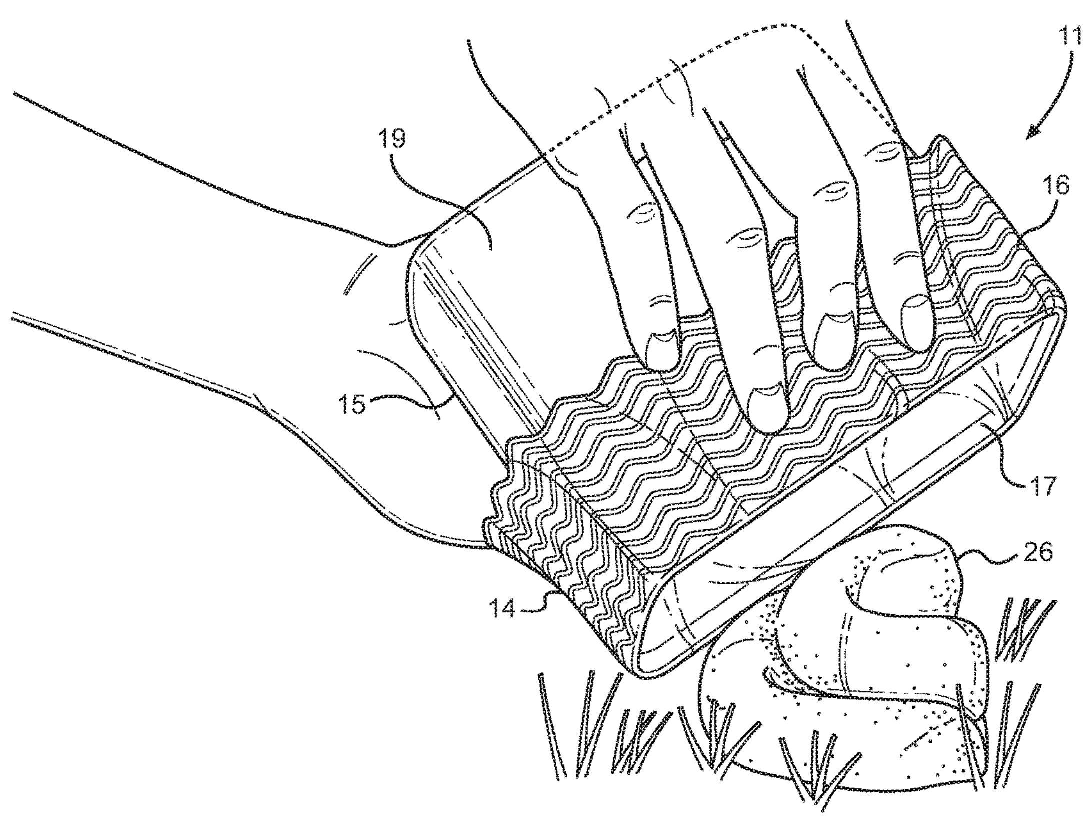
FIG. 2 shows a perspective view of a waste receptacle according to the present invention in use.

Referring now to FIG. 2, there is shown a perspective view of a waste receptacle according to the present invention in use. In the illustrated embodiment, the waste receptacle is shown having a rigid lower portion 15, which prevents the sensation of contact between the user's hands and the pet waste 26 that is being picked up with the waste receptacle 11. In use, a user may grip the waste receptacle 11 along the ridges 16 and place the opening 17 over the pet waste 26 to be picked up. The user may then fold the upper portion 14 of the sidewalls around and under the pet waste 26 in order to contain the pet waste 26 within the interior volume 19 of the waste receptacle 11.

The ridges 16 on the upper portion 14 prevent the user from feeling the contours of the pet waste when picking it up. The upper portion 14 is configured to maintain its shape when hand formed, so that the waste receptacle 11 may be turned over after placing the upper portion 14 under the pet waste 26. This causes the pet waste to be contained by the interior volume 19 of the waste receptacle 11. The user may further fold down the upper portion 14 of the sidewalls, closing off the opening 17 and preventing the pet waste 26 from exiting the interior volume 19. The user may then dispose of the waste receptacle 11 in a garbage bin or other proper disposal location.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A waste receptacle comprising:

a substantially planar base;

peripheral sidewalls disposed on a perimeter of the base extending vertically therefrom, the peripheral sidewalls each having an upper portion and a lower portion;

an interior volume bound by the peripheral sidewalls and the base; and an opening defined by the upper portion of each of the peripheral sidewalls for accessing the interior volume;

wherein the upper portion of each of the peripheral sidewalls is malleable and configured to maintain a particular shape when hand-formed; and wherein the upper portion of each of the peripheral sidewalls and the lower portion of each of the peripheral sidewalls are connected to a support member, wherein the support member encircles the perimeter of the base.

2. The waste receptacle of claim 1, wherein the upper portion of each of the peripheral sidewalls further comprises a plurality of ridges disposed thereon.

3. The waste receptacle of claim 2, wherein the ridges are composed of a bendable material.

4. The waste receptacle of claim 1, wherein the waste receptacle is composed of a waterproof material.

5. The waste receptacle of claim 1, wherein the lower portion of each of the peripheral sidewalls is pliable.

6. The waste receptacle of claim 1, wherein the lower portion of each of the peripheral sidewalls is rigid.

7. The waste receptacle of claim 1, wherein the lower portion of each of the peripheral sidewalls is integrally formed with the base.

8. The waste receptacle of claim 1, wherein the upper portion of each of the peripheral sidewalls is integrally formed with the lower portion of each sidewall.

9. The waste receptacle of claim 1, wherein the support member is a rigid rod.

10. The waste receptacle of claim 1, wherein the support member bisects the waste receptacle along a length thereof.

* * * * *